United States Patent
Gaillard

(10) Patent No.: US 11,097,355 B2
(45) Date of Patent: Aug. 24, 2021

(54) CLAMPING CHUCK WITH INCLINED SLIDES

(71) Applicant: TECHNIC.COM, Paris (FR)

(72) Inventor: Jean-Christophe Gaillard, Paris (FR)

(73) Assignee: TECHNIC.COM, Paris (FR)

( * ) Notice: Subject to any disclaimer, the term of this patent is extended or adjusted under 35 U.S.C. 154(b) by 44 days.

(21) Appl. No.: 16/498,933

(22) PCT Filed: Mar. 22, 2018

(86) PCT No.: PCT/FR2018/050692
§ 371 (c)(1),
(2) Date: Oct. 25, 2019

(87) PCT Pub. No.: WO2018/178542
PCT Pub. Date: Oct. 4, 2018

(65) Prior Publication Data
US 2020/0384545 A1    Dec. 10, 2020

(30) Foreign Application Priority Data
Mar. 28, 2017    (FR) ...................................... 1770307

(51) Int. Cl.
*B23B 31/12* (2006.01)
*B23B 31/177* (2006.01)

(52) U.S. Cl.
CPC ........ *B23B 31/1253* (2013.01); *B23B 31/123* (2013.01); *B23B 31/1215* (2013.01);
(Continued)

(58) Field of Classification Search
CPC . B23B 31/123; B23B 31/1253; Y10T 279/19; Y10S 279/901
See application file for complete search history.

(56) References Cited

U.S. PATENT DOCUMENTS 3,248,122 A * 4/1966 Roddy ................ B23B 31/1215
  279/110
3,633,929 A * 1/1972 Morawski ........... B23B 31/1215
  279/127
(Continued)

FOREIGN PATENT DOCUMENTS

DE    19803500 A1 *  8/1999  ........... B23B 31/025
EP    0626225 A1 * 11/1994  ........... B23B 31/302
(Continued)

OTHER PUBLICATIONS

International Search Report for PCT/FR2018/050692 dated Jul. 9, 2018 [PCT/ISA/210].

*Primary Examiner* — Eric A. Gates
(74) *Attorney, Agent, or Firm* — Sughrue Mion, PLLC

(57) ABSTRACT

A clamping chuck having a body (2) with a slidable spindle (7) in a housing (9). The housing is inclined relative to the axis (xx') of the chuck and exiting through the front face (3), the spindle (7) movement driven by a piston (19) along the chuck axis and the spindle equipped with a groove (15) into which slides a drive section (25) of the piston. An end of the spindle (7) has a notch (17) exiting into the groove (15) such that, when positioning the spindle from the front face (3) of the chuck, allows the spindle (7) to move along the drive section (25) and touch the latter and enable its groove (15) to be positioned facing the drive section (25), such that such that after one rotation of the spindle (7) around its axis (uu'), the groove (15) engages with the drive section (25).

11 Claims, 8 Drawing Sheets

Figure 2A:
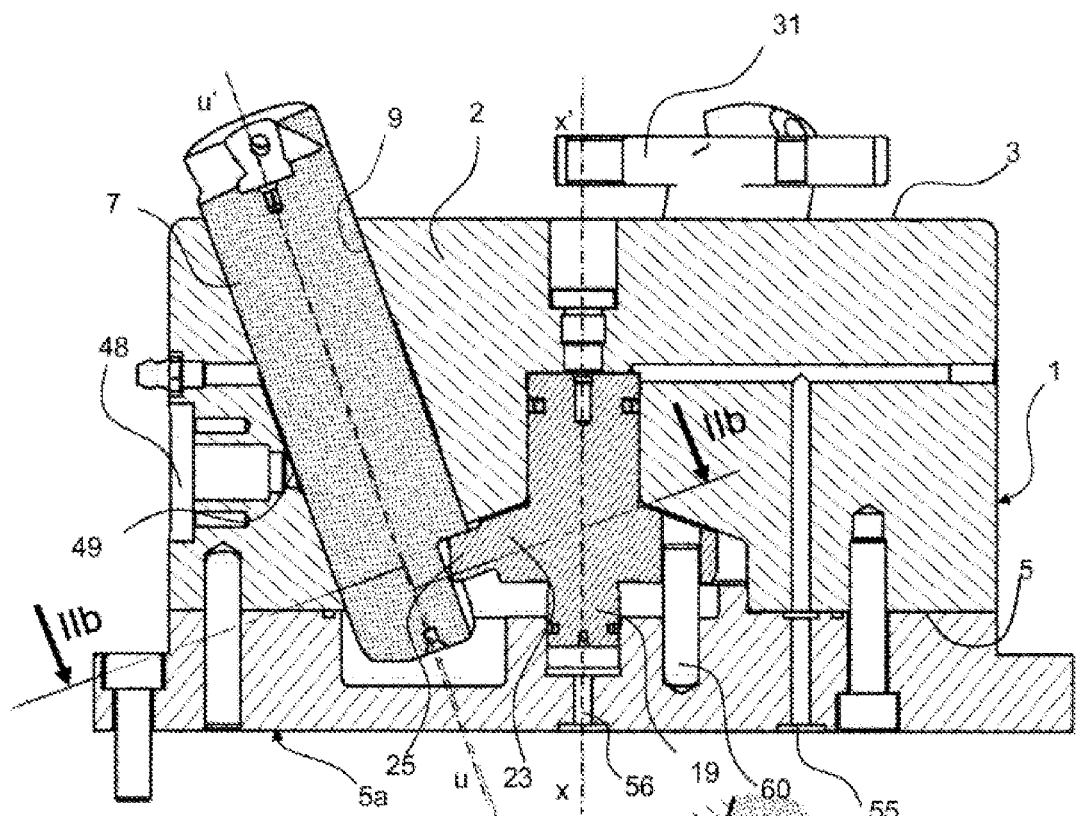

(52) U.S. Cl.
CPC ..... *B23B 31/16266* (2013.01); *B23B 2240/04* (2013.01); *Y10S 279/901* (2013.01); *Y10T 279/19* (2015.01)

(56) References Cited

U.S. PATENT DOCUMENTS

| | | | |
|---|---|---|---|
| 3,707,292 A | 12/1972 | Morawski et al. | |
| 3,833,229 A | 9/1974 | Hohwart et al. | |
| 4,570,949 A * | 2/1986 | Morawski | B23B 31/1253 279/110 |
| 6,170,835 B1 * | 1/2001 | Noss | B23B 31/1253 279/121 |
| 6,394,467 B1 | 5/2002 | Oki et al. | |
| 6,910,693 B2 * | 6/2005 | Onyszkiewicz | B23B 31/1215 279/106 |
| 2005/0067797 A1 | 3/2005 | Onyszkiewicz et al. | |
| 2014/0001712 A1 | 1/2014 | Helm et al. | |

FOREIGN PATENT DOCUMENTS

| | | | |
|---|---|---|---|
| EP | 2103367 A1 * | 9/2009 | ............. B23B 31/14 |
| JP | 62173107 A * | 7/1987 | ......... B23B 31/1253 |

\* cited by examiner

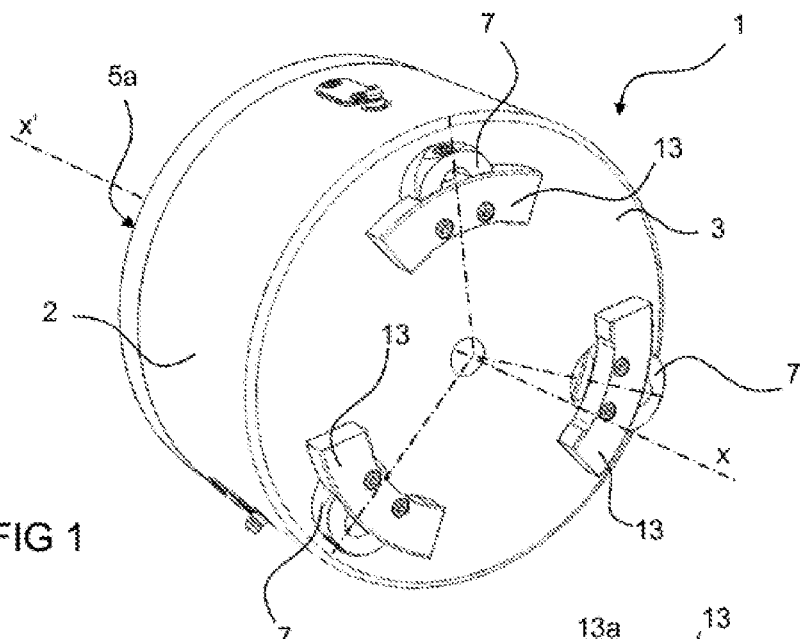
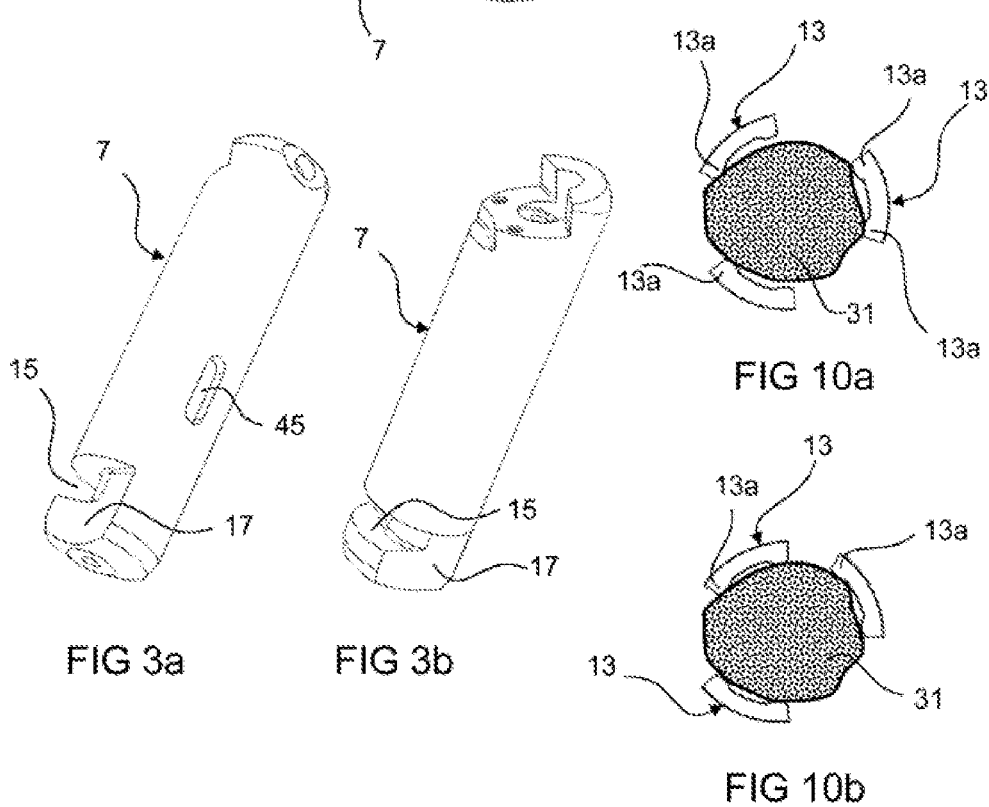

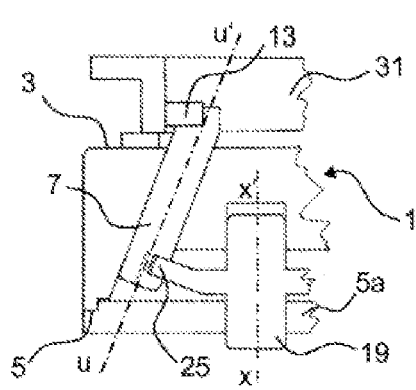
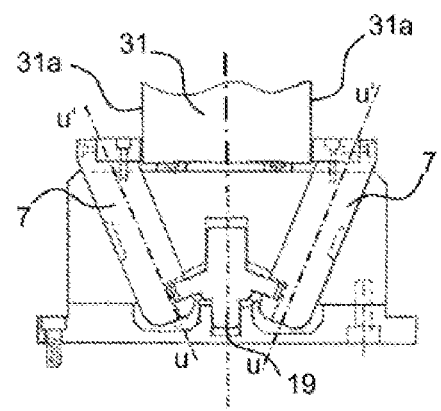
FIG 14    FIG 15
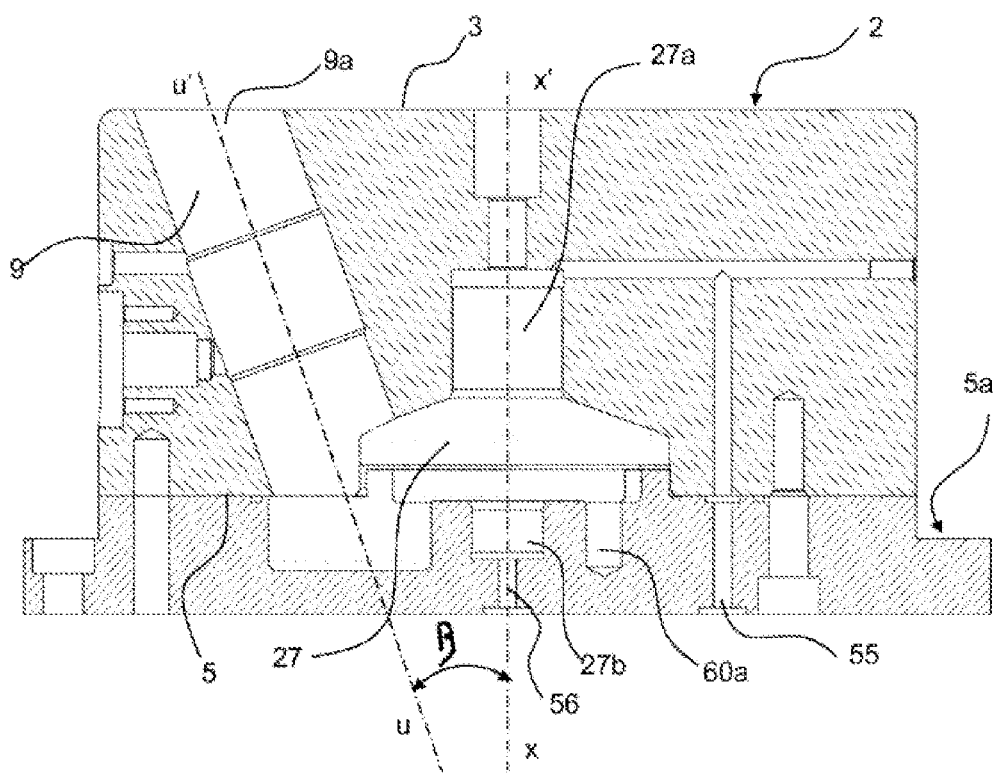
FIG 2e

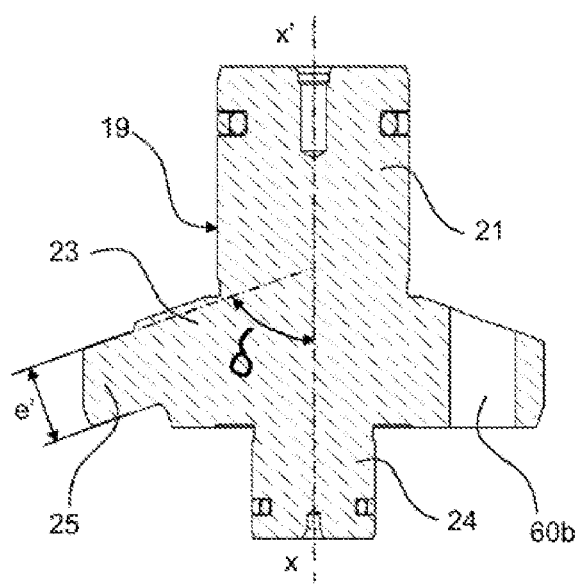
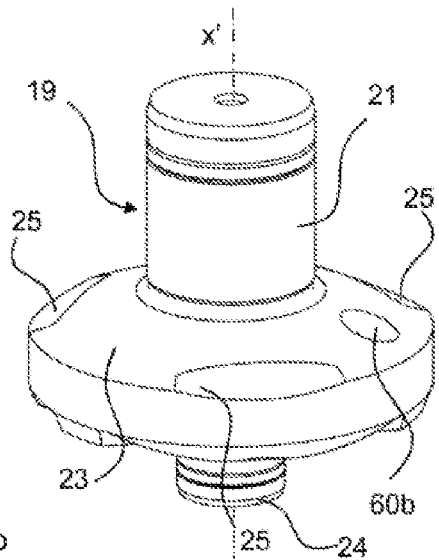
FIG 4a  FIG 4b
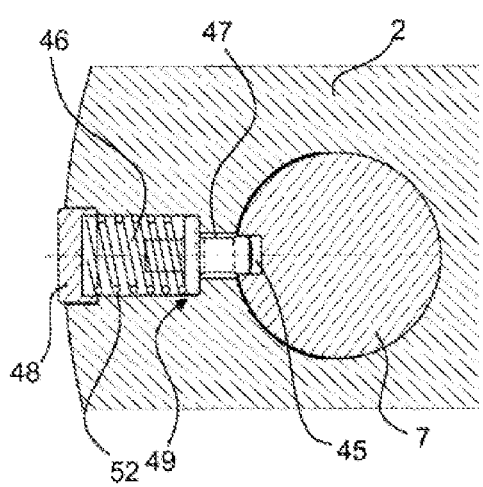
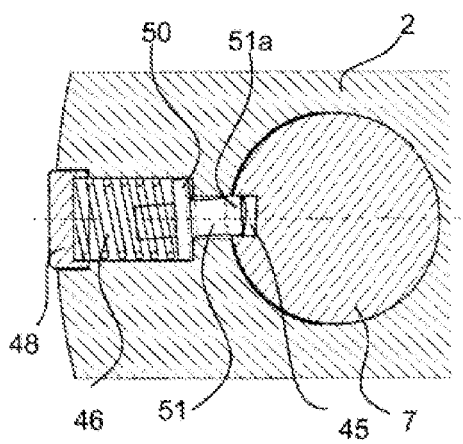
FIG 13a  FIG 13b

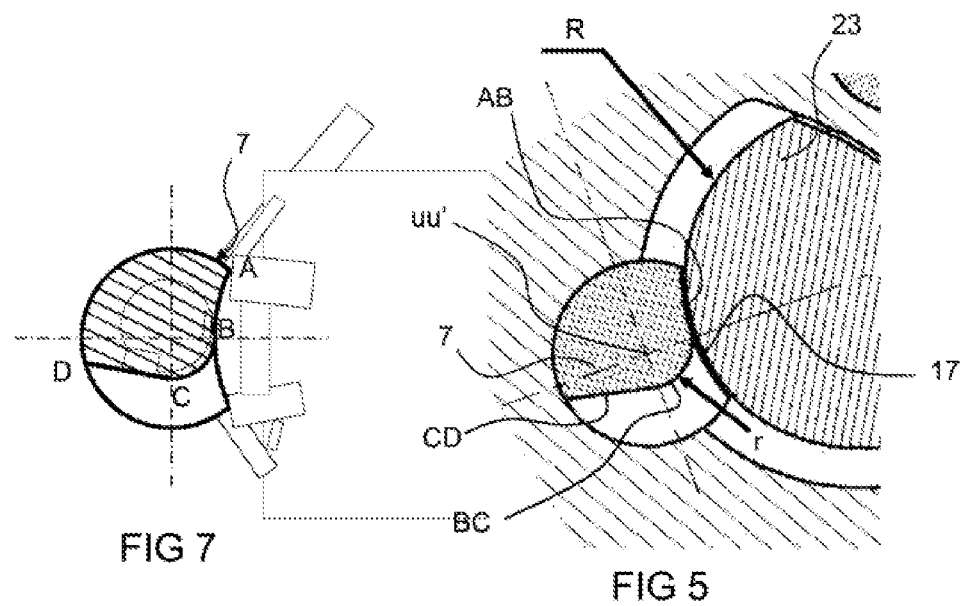
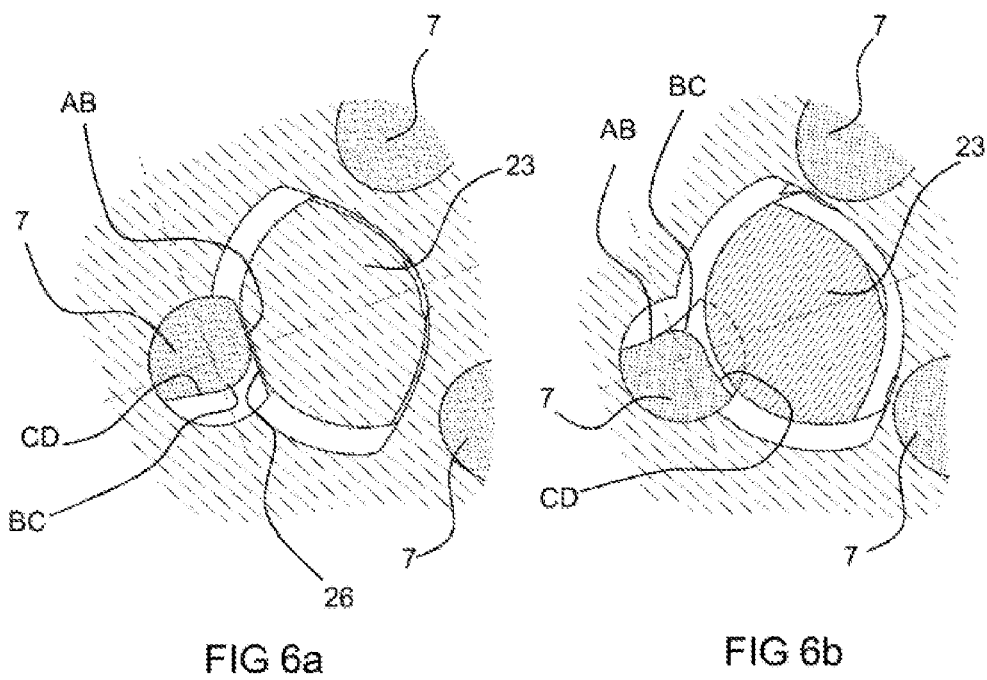

CLAMPING CHUCK WITH INCLINED SLIDES

CROSS REFERENCE TO RELATED APPLICATIONS

This application is a National Stage of International Application No. PCT/FR2018/050692 filed Mar. 22, 2018, claiming priority based on French Patent Application No. 1770307 filed Mar. 28, 2017.

This invention relates to a precision collet clamping chuck for machine-tools, in particular for machining or milling centers.

Firstly, "conventional" chucks, in which the jaws move radially, are well-known and are used preferentially on machining tools such as lathes. We know that, while such chucks have the advantage of being able to securely hold parts with very different diameters, they nevertheless have the drawback of not ensuring a precise and repeatable hold with regard to the positioning of these parts, insofar as when clamping is completed, the parts held tend to slip away from the front face of the chuck.

To avoid this drawback, precision chucks known as collet chucks are available in which, when clamping is completed, the parts are pressed against the front face of the chuck, which positions them axially in a precise and repeatable manner. Moreover, due to the design of this type of chuck, their tightness with regard to dust, chips and machining fluids is greatly improved.

These collet clamping chucks can be classified in two main categories, namely: chucks that clamp around the part to be held from the outside and those that clamp around the part from the inside.

In both cases there are major constraints in the design of collet clamping chucks.

One constraint is to be able to have sufficient space around the drive sources between the control piston that moves the spindles and the latter so that these drive sources can enable the spindles to be both positioned from the front face of the chuck and locked with the piston. However, while such space is relatively easy to obtain in chucks that clamp from the inside, due to the fact that the spindle axes diverge from the front face towards the rear face of the chuck, experience has shown that such space is much more difficult to obtain in chucks that clamp from the outside, in which the spindle axes converge towards the rear of the chuck. In this latter case, the situation is even more difficult in chucks with small diameters.

A second constraint is to create a lock between the control piston and each of the spindles that has sufficient contact surface to enable the chuck to clamp efficiently on the pieces to be held without damaging them.

A third constraint is to enable the spindles, when they are in engaged with their drive source, to rotate at low amplitude around their longitudinal axis, so as to enable the jaws with which they are equipped to adapt to the surface of the piece to be held, this adaptation being hereafter referred to as "oscillation."

There are collet chucks that clamp on the parts to be held from the center and in which the spindles are positioned from the front faces of the chucks, with the base of these spindles locking onto drive sources composed of a mounted mobile control piston that runs along the spindle axis.

U.S. Pat. No. 3,707,292 discloses such a chuck in which the base of the control piston has a triangular cross-sectional shape and each of the faces thus formed has a nipple which, when locking, engages in a groove of one spindle in such a way as to clip securely into the latter, similar to a bayonet mount. It can be understood that such a solution has the drawback of only being applicable to chucks that only require a limited clamping force due to the nipples' low shear resistance. Moreover, this solution excludes the implementation of oscillation means.

US patent application 2005/0067787 also discloses a collet chuck of the same type, in which the spindles are not arranged inside the body of the chuck but in the control piston, such that when the latter moves along the axis of the chuck when clamping/loosening, the spindles do not move exclusively along their longitudinal axis but are radially guided only by their foot, which subjects them to bending that is detrimental to effective clamping.

Lastly, U.S. Pat. No. 3,833,229 discloses a collet chuck of the previously-described type in which the foot of the spindles is cut in such a way as to form a flat area that, on locking, is able to fit into a piston fork in the form of a radial groove, such that after a quarter turn around its longitudinal axis it is locked into this piston. Due to the amount of space required to create forks on the control piston, this type of implementation can only be carried out on chucks with large diameters, especially in the case of exterior chucks that clamp from the outside and in which the spindles converge towards the back of the chuck, leaving very little room to ensure they lock into the control piston.

This invention aims to remedy these drawbacks by proposing a collet chuck in which the means of engaging the spindles in their control piece are easily achieved, able to transmit heavy clamping efforts, enable oscillation while occupying a significantly reduced amount of space in comparison with the systems in the prior art, and thus enable chucks with smaller diameters to be made, in particular chucks that clamp from the outside.

This invention also aims to provide a clamping chuck comprising a body accommodating at least one slideably mounted spindle in a housing in the body, said housing being inclined relative to the axis of the chuck and exiting through the front face of the latter, the spindle movement being driven by the movement of a piston along the chuck axis and said spindle being equipped at one end with a groove into which a drive section of the piston slides, the latter and said groove being perpendicular to the axis of said spindle.

This chuck is characterized in that the second end of the spindle comprises a notch exiting into the groove such that, when positioning the spindle from the front face of the chuck, it allows the spindle to move along the drive section and touch the latter and enable its groove to be positioned facing said drive section, such that after one rotation of the spindle around its axis, the groove engages with the drive section.

The notch will preferentially be formed by a concavity running from the second end of the spindle and opening into the groove.

The piston may comprise a side plate from which the drive section will be created and the bottom of the notch may have a straight section with a complementary shape to that of the plate of the drive section.

This plate may revolve around its axis and the bottom of the notch may then be circular in shape with a radius similar to that of the plate.

The edge of the drive section of the plate may comprise, facing the spindle, a flat area, and the bottom of the notch will then be rectilinear.

According to the invention, the bottom of the groove may comprise three zones, i.e., a zone in which the profile will be complementary to that of the edge of the drive section of the plate, a semi-circular zone in which the radius will be equal to the distance between its axis and the edge of the drive section of the plate, and a third zone.

The latter may be rectilinear such that, after the aforementioned spindle rotation, it is next to the edge of the drive section of the plate.

The third zone may also be such that, after the aforementioned spindle rotation, its shape is complementary to that of the edge of the drive section of the plate.

The chuck according to the invention may comprise a means of controlling the oscillation range of a jaw attached to this spindle.

This means of control may comprise a longitudinal recess built into the spindle into which a nipple connected to the body of said chuck fits and which has a diameter that is less than the width of the longitudinal recess.

The chuck according to the invention may comprise means of triggering the rotation of the spindle around its longitudinal axis to balance it. These means may comprise a retaining element arranged in a housing in the chuck body comprising a base at the bottom of this housing that is elastically pressed, this base extending by a head that fits into the recess.

In an alternate embodiment, the piston will be equipped with indexing means that can position it relative to the spindle housing such that the drive section is placed facing the latter.

Figure 2B:
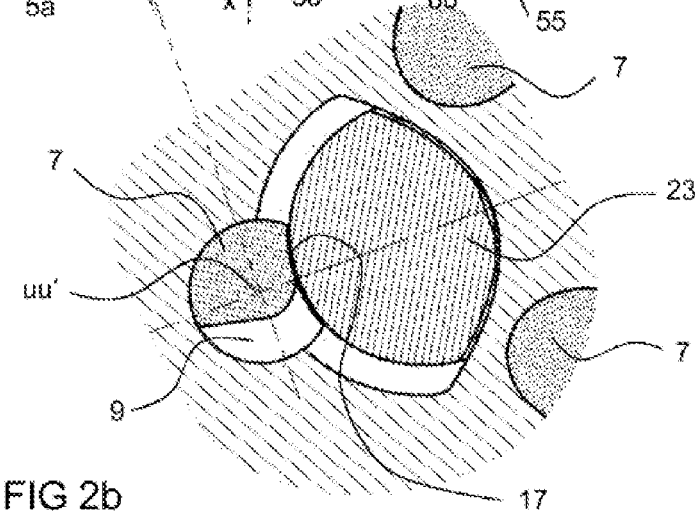
Figure 2C:
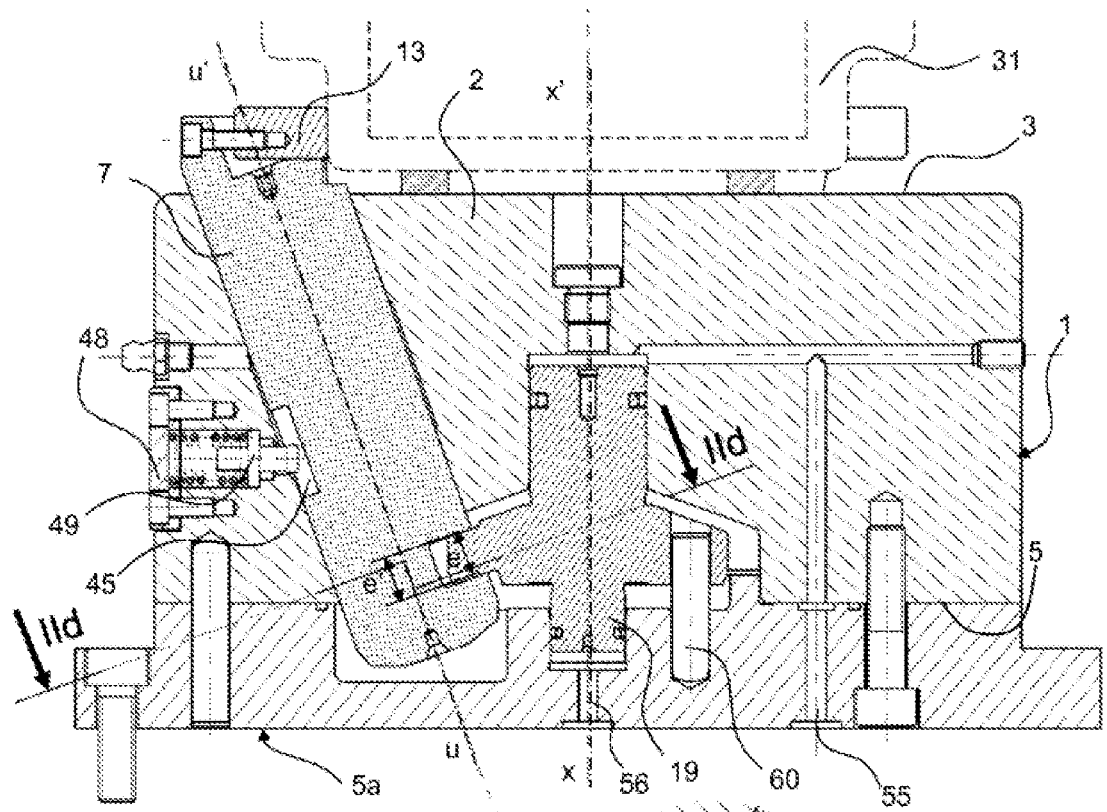
Figure 2D:
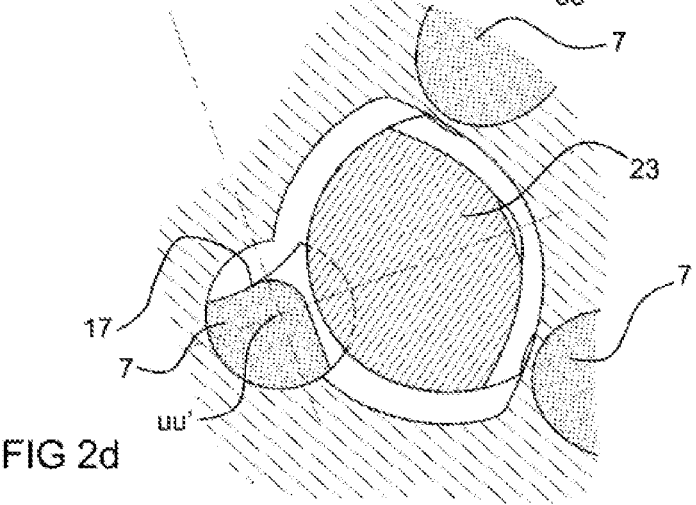
Figure 8:
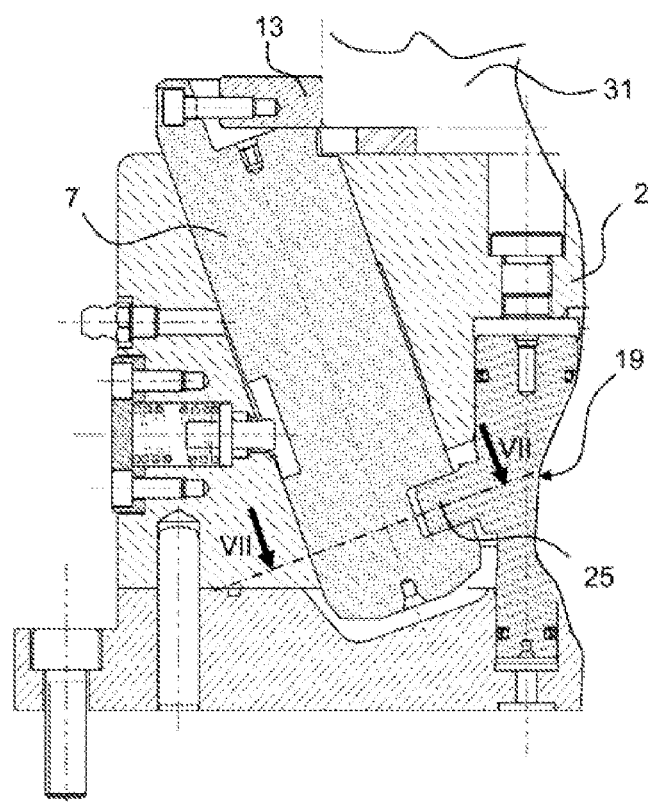
Figure 9A:
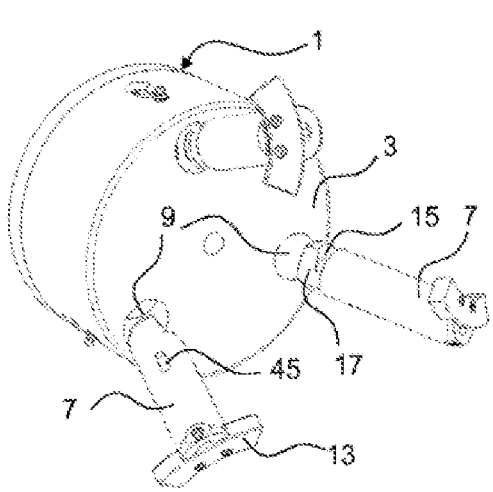
Figure 9B:
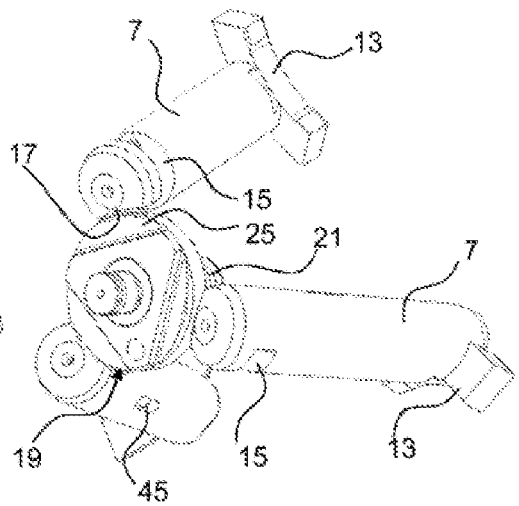
Figure 9C:
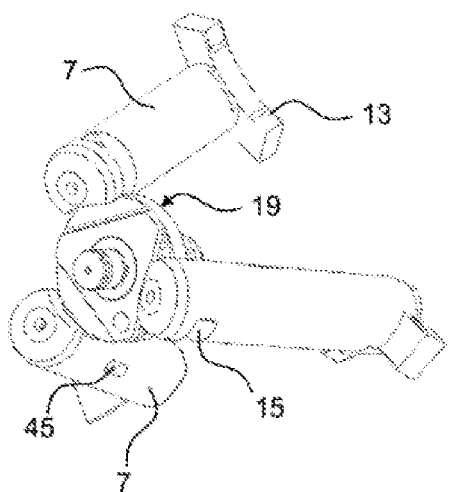
Figure 9D:
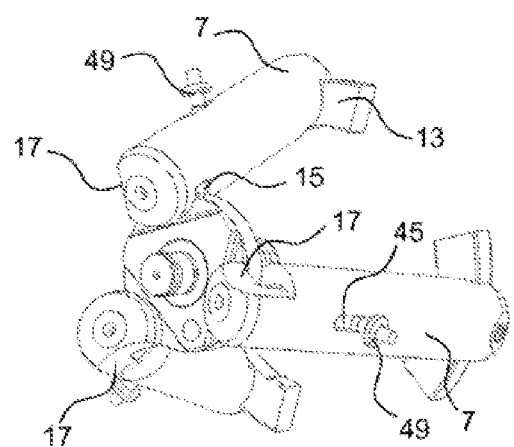

Various embodiments of this invention will be described hereafter, as non-limiting examples, in reference to the appended drawings in which:

FIG. 1 is a perspective view of a collet chuck according to the invention,

FIG. 2a is an axial and diametrical cross-cut view of the chuck shown in FIG. 1, in the spindle insertion position, FIG. 2b is a partial cross-cut view of the chuck shown in FIG. 2a along the dotted section line IIb-IIb of the latter, FIG. 2c is an axial and diametrical cross-cut view of the chuck shown in FIG. 1, in the clamping position, FIG. 2d is a partial cross-cut view of the chuck shown in FIG. 2d along the dotted section line IId-IId of the latter, FIG. 2e is an axial and diametrical cross-cut view of the chuck body and its end plate, FIG. 3a is a perspective view of a spindle implemented in the chuck according to the invention, FIG. 3b is a perspective view of the spindle shown in FIG. 3a after its rotation about 90° around its longitudinal axis, FIG. 4a is an axial and diametrical cross-cut view of a spindle control piston implemented in the chuck according to the invention, FIG. 4b is a perspective view of the spindle control piston shown in FIG. 4a, FIG. 5 is an enlarged partial view of FIG. 2b, FIG. 6a is a partial cross-cut view of an alternate embodiment of the control piston plate and the spindle recess associated with it in the latter's insertion position, FIG. 6b is a partial cross-cut view of a second alternate embodiment of the control piston plate and its associated spindle recess, with the chuck clamped, FIG. 7 is a diametrical cross-cut view of a spindle along line VII-VII of FIG. 8, FIG. 8 is a partial axial and diametrical cross-cut view of an alternate embodiment of a chuck according to the invention, FIG. 9a is a perspective view showing the insertion of the spindles into the body of the chuck, FIG. 9b is a perspective view showing the spindles and their control piston during their insertion into the body of the chuck, with the latter not being shown, FIG. 9c is a perspective view showing the three spindles and their control piston during first step of their insertion into the body of the chuck, with the latter not being shown and the spindles ready to be locked onto the piston, FIG. 9d is a perspective view showing the three spindles and their control piston in the second step of their insertion into the body of the chuck, with the latter not being shown and the spindles locked onto the piston, FIGS. 10a and 10b respectively give schematic views of a part clamped by the jaws without any "oscillation" and with "oscillation,"

Figure 11:
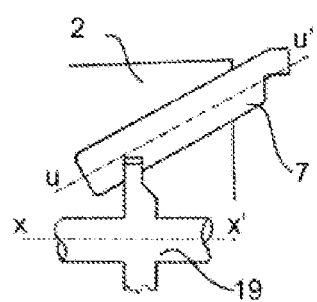
Figure 12:
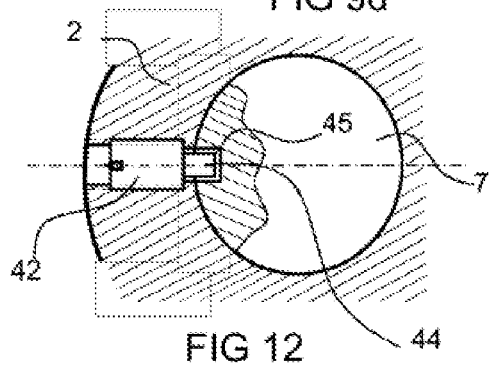

FIG. 11 is a schematic view showing a spindle and a control piston connected according to the prior art, FIG. 12 is a diametrical cross-cut view of the chuck body showing a first system for controlling the "oscillating" range of the spindles, FIGS. 13a and 13b are diametrical schematic cross-cut views of the chuck body in the initial position after "oscillation" of the spindles, FIG. 14 is a drawing showing an axial and diametrical cross-cut view of an alternate embodiment relative to the slope of the spindles, FIG. 15 is a drawing showing an axial and diametrical cross-cut view of an alternate embodiment of a chuck with two spindles.

The drawings show a precision collet chuck according to the invention.

This cylindrical chuck 1 with a longitudinal axis xx', is formed by a cylindrical chuck body 2 comprising a front face 3 ("front face") and an opposite face 5 ("rear face"), the latter equipped with an end plate 5a. This chuck which, in this example, is meant to be mounted on a machining center, could of course also equip a machine-tool such as a lathe, a grinder, a gear cutting machine, etc.

It comprises three cylindrical spindles 7 slideably mounted in three housings 9 built into the body 2 and exiting through the front face 3 through three openings 9a that are regularly positioned around the edge of the latter, i.e. their centers form between them equal 120° angles with the center. A first end of each spindle, known as the active end, extends out of the front face 3 and holds a jaw clamp 13.

As shown in FIG. 2e, the longitudinal axis uu' of each of the housings 9 of the spindles 7 is sloped in relation to the axis xx' of the chuck body 2 at an angle β of about 20° in this example. This axis uu' draws closer to the chuck axis xx' from the front face 3 to the rear face 5.

As shown in FIGS. 3a and 3b, the second end of the spindles 7, hereafter called the foot, is cut from a semi-circular groove 15 of which the two lateral edges are parallel and positioned in the perpendicular plane of the axis uu', this groove exiting at the upper end of a notch 17 of which the shape and dimensions are specified hereafter.

The movement of the spindles 7 is driven by a revolving piston 19 of axis xx' comprising, successively, from top to bottom in FIGS. 4a and 4b, a cylindrical head 21, a plate 23, and a cylindrical boss 24. The rear face 5 of the chuck body is hollowed by an axial cavity 27 for holding the piston 19 and its plate 23 and comprises axial reaming 27a into which the head 21 can slide up, and the boss 24 is slideably mounted in a corresponding reaming 27b in the end plate 5a, as shown in FIGS. 2a and 2c.

The notch 17 is composed of a hollow, or concave, area of the spindle 7, in particular made during their machining, this area being symmetrical in relation to an axial plane of the spindle 7 and extending from the end of the spindle foot to exit into the semi-circular groove 15.

The shape and the depth of this notch 17 is such that, as shown in FIGS. 2a, 2b, and 5, the end of the latter is complementary in shape to that of the plate 23 such that it touches it in all points, i.e. it comes closest to the plate when the piston 19 is in the raised position, or position for inserting the spindle, as shown in FIG. 2a.

In this embodiment of the invention, the form of the section of the plate 23 being circular with a radius R, the notch 17 consequently also has a circular section with a radius similar to the former.

As specified previously and shown in the figures, the upper part of the notch 17 exits into the groove 15. In this embodiment and as shown in FIG. 7, the bottom of the groove 15 is thus composed of three parts, i.e. a concave and circular part AB with a radius similar to that of the plate 23 and complementary to the latter and corresponding to the notch 17, a rounded quarter-circle part BC of which the radius r is equal to the distance between the longitudinal axis uu' of the spindle 7 of the plate 23; and a rectilinear part CD such that it is close to the plate 23 when the spindle has been locked onto the plate after having rotated a quarter turn around its longitudinal axis uu' as explained hereafter and shown in FIG. 2d.

Of course, according to the invention, the edge of the drive section 23 of the plate 23 could, as required, be other than circular and could, for example, have a hexagonal-shaped straight section or, as shown in FIG. 6a, comprise, facing the spindle, a flat area 26, such that, in these conditions, the shape of the bottom of the notch 17 would also be rectilinear, since its shape is complementary to this flat area.

In another alternate embodiment of the invention, the part CD of the bottom of the groove 15 may not be rectilinear such that, after the rotation of the spindle 7 which engages the latter with the drive section 25 of the plate, the part CD has a shape that is complementary to that of the edge of the drive section 25 of the plate, as shown in FIG. 6b. On this latter, the part CD at the bottom of the groove 15 will thus be circular like the plate.

Mounting the piston 19 into the body of the chuck 2 is done through the rear face 5 of the latter, and this latter is closed after mounting by an end plate 5a. The cavity 27 has a height that allows the piston 19 to move axially, and this movement is guided by the reaming 27a and 27b.

Rear mounting of the piston 19 into the body of the chuck 12 is particularly interesting, in that avoids weakening the front face 3 of the latter.

So that the piston 19 can move the spindles 7 in their respective housings 9, the plate 23 comprises a drive section 25 associated with each spindle, of which two edges are parallel and inclined relative to the axis xx' at an angle δ the value of which is complementary to that of the angle β, i.e. in this example a value of around 70°, such that, as explained hereafter, the drive sections 25 are parallel to the lateral edges of the grooves 15 of the spindles 7, such that they can slide up into the latter when the piston and the spindles are positioned in the body of the chuck 2.

To this end the thickness e' of each of the three drive sections 25 is slightly less at the width e of the grooves 15, such that each of the drive sections 25 can adjust in these latter as explained hereafter.

This invention allows the spindles 7 to be inserted when the piston 19 has been raised into the cavity 27.

FIGS. 9a to 9d show the essential phases of the insertion of the spindles 7 into the body of the chuck 2.

As shown in FIG. 9a, each spindle is first placed in front of the opening 9a of its housing 9. For better clarification of the explanations, the spindles 7 and the control piston 19 have been shown in the position they occupy inside the chuck body, but without showing all of the other elements of the chuck.

In a first insertion step, each spindle 7 is then lowered into its housing 9, as shown in FIG. 9b, until its groove 15 is at the level of the drive section 25 of the plate 23. To do this, the piston 19 was previously moved to the raised position and rotated on its axis xx' to place it in a reference position using the indexing means described hereafter. Each spindle is then positioned so that its notch 17 is turned towards the center of the chuck and more precisely towards the drive section 25 with which its engagement desired. The notch 17, which is designed so that it touches the edge of the drive section of the plate 23 when the piston 19 is in the raised position as specified previously, enables the spindle 7 to be lowered until its notch 15 is at the level of the drive section 15, as shown in FIG. 9c.

In a second phase, each spindle 7 is rotated a quarter turn around its longitudinal axis uu' so that its notch 15 receives the drive section 25, which ensures the linear connection, or engagement, of the spindles with the piston, as shown in FIG. 9d.

Of course, to make insertion easier, it is possible according to the invention to provide for means of blocking the slide of the spindles 7 inside their respective housings 9, when inserting, with the notches 15 positioned facing the drive sections 25 as shown in FIG. 9c.

This invention is particularly interesting in that is makes it possible to engage, or lock, the spindles onto the control piston which, firstly, is a much simpler mechanical design than the bayonet-type locking systems in the prior art. Secondly, these locking means require much less space inside the chuck body than that required by the known locking methods, in particular the aforementioned bayonet locking methods. It is thus possible to make chucks with much smaller diameters, which is particularly interesting when these chucks clamp from the outside, with their spindles converging towards the rear of the chucks, such that the available space for adding locking methods is extremely limited.

This invention is also interesting in that the system of engaging, or locking, the control piston with the spindles does not create any zone of least resistance contrary to the systems in the prior art in which the transmission of the effort between the control piston and the spindles takes place, for example, by means of a nipple or requiring cutting a notch into the control piston plate.

Lastly, this invention enables clamping of parts to be held that allows for the use of oscillation means.

Indeed, it can be seen that this invention allows each of the spindles 7, when inserted, to freely rotate around its longitudinal axis uu', due to the fact that said axis is perpendicular to the drive section 25.

This has been shown schematically in FIGS. 10a and 10b of the jaws 13 attached at the end of the respective spindles 7. In these illustrations the jaws 13 are clamping a metal part 31 with a profile that is not strictly circular and we know that, in such a configuration, the two supporting ends 13a of the jaws 13 do not come into contact with the part 31, such that clamping occurs more or less randomly, which is detrimental to the repeatability required in precision machining.

It will be recalled that with prior art collet chucks in which the drive section is not perpendicular to the longitudinal axis of the spindles, as shown schematically in FIG. 11, the spindles cannot rotate around their longitudinal axis uu', which thus prevents any oscillation of the jaws and leads accordingly to the drawbacks previously described.

When the spindles 7 can rotate around their longitudinal axis uu' as is the case in this invention, we thus know that each supporting end 13a of the jaws is touching the part 13, as shown in FIG. 10b, which prevents these drawbacks.

Of course, according to the invention, means can be implemented to limit the oscillation range of the spindles 7. In a first example, shown in FIG. 12, these means are composed of a screw 42 that radially traverses the body of the chuck 2, with one end forming a nipple 44 of a smaller diameter that penetrates into the longitudinal recess 45 of the spindle 7, whose width is greater in diameter than the latter. It will be understood that, under these conditions, the size difference between the diameter of the nipple 44 and the width of the recess 45 enable the rotational range of the spindle to be controlled during oscillation and thus that of the jaws 13 that are connected to it.

It is also possible to implement means that can not only limit the spindle rotation range, but also elastically trigger the latter to stabilize.

Such means have therefore been shown as an enlargement in FIGS. 13a and 13b. Thus, as in the previous example, a longitudinal recess 45 has been cut into each of the spindles 7 and a radial hole 46 has been pierced through the body of the chuck 2, which is extended by a hole 47 with a smaller diameter that exits from the spindle housing 9 at the level of the recess 45 in the latter when it is in place, as shown in FIG. 13a. The hole 46 is sealed off on the outer side of the chuck body by a plug 48. The hole 46 holds a retaining element 49 comprising a baseplate 50 extending on either side of the spindle by means of a boss 51 that ends in a substantially spherical head 51a that penetrates into the recess 45. A compression spring 52 is housed in the hole 46 and presses the baseplate 50 against the bottom of the hole. The diameter of the hole 47 is greater than that of the boss 51 such that, when the spindle 7 is triggered to rotate around its axis uu', which occurs when, as shown in FIG. 10b, the part to be clamped 31 is slightly irregular, the spherical head 51a can move and the retaining element 49 then rotates slightly against the action exerted by the retaining spring 52 on its base 50. Thus, the jaws 13 which are connected to the spindles 7 can oscillate and, in addition, they are triggered to move back to a touch position.

The piston 19 is equipped with an indexing system that enables it to be positioned inside the body of the chuck 2 so that the drive sections 25 are arranged automatically facing the housings 9. In this embodiment the system consists of a centering pin 60 that fits into a hole 60a in the end plate 5a and in a hole 60b of the plate 23 of the piston 19.

In this embodiment of the invention, the movement of the control piston 19 in the springs 7 is ensured by a pressurized hydraulic flow, but it could of course be ensured by any other means, including pneumatic or mechanical means.

In this embodiment of the invention, the body 2 of the chuck has a power supply channel 55 for this purpose, starting at the rear face 5 of the end plate 5a of the chuck and ending in the upper part of the piston 19 head 21. When the pressurized hydraulic flow enters this channel 55, it pushes the piston 19 which moves the spindle 7 towards the rear of the chuck, which clamps the part 31 and holds it for as long as the pressurized fluid is maintained in the channel 55. Loosening the chuck is done by reversing the action of the pressurized hydraulic fluid through a channel 56 that starts at the rear face of the end plate 5a and ends under the base of the boss 24 of the piston 19.

This invention is therefore particularly interesting in that it makes it possible, in an especially simple way, to engage the control piston with the spindles, by means that are capable of transmitting heavy efforts, with these means also taking up a small amount of space. This makes it possible to make chucks with smaller diameters than those of the prior art, in particular with regard to chucks that clamp from outside.

This invention also makes it possible to oscillate the jaws, which was impossible with some collet chucks in the prior art.

Of course, and although the previously-described examples embody spindles that are sloped from the outside of the chuck to the inside when observed from the front face 3 to the rear face 5, it is also possible according to the invention, and as shown in the schematic FIG. 14, to have embodiments of these chucks which, inversely, comprise spindles 7 sloping from the inside of the chuck to the outside when observed from the front face 3 to the rear face 5. Such chucks are particularly interesting when parts 31 must be clamped from the inside of the chucks.

Lastly, this invention is perfectly applicable to chucks comprising any number of spindles.

Thus, as shown in FIG. 15, the collet chuck according to the invention may comprise, for example, two spindles 7. Such an application is particularly interesting when chucking two parts 31 with two parallel faces 31a. Such a chuck also offers the advantage of being able to position the central plane P with rigorous accuracy relative to its parallel lateral faces 31a.

The invention claimed is:

1. A clamping chuck comprising a body accommodating at least one slideably mounted spindle in a housing in the body, said spindle comprising a first end and a second end, said housing being inclined relative to the axis of the chuck and exiting through the front face of the latter, the spindle movement being driven by the movement of a piston along the chuck axis and said spindle being equipped at one end with a groove into which slides a drive section of the piston, the latter and said groove being perpendicular to the axis of said spindle, wherein:
   the second end of the spindle comprises a notch exiting into the groove such that, when positioning the spindle from the front face of the chuck, the notch allows the spindle to move along the drive section and touch the latter and enable the groove to be positioned facing said drive section, such that after rotation of the spindle around the axis of the spindle, the groove engages with the drive section;
   wherein the piston comprises a plate from which the drive section is created and a bottom of the notch has a section taken perpendicular to the axis of the spindle with a complementary shape to that of the plate of the drive section, wherein the plate revolves around an axis of the plate and the bottom of the notch is circular in shape with a radius similar to that of the plate.

2. The clamping chuck according to claim 1, wherein the notch is comprised of a concavity running from the second end of the spindle and opening into the groove.

3. The clamping chuck according to claim 1, wherein the bottom of the groove comprises three zones, that are a zone (AB) in which the profile is complementary to that of the edge of the drive section of the plate, a semi-circular zone (BC) in which the radius (r) is equal to the distance between the axis of the spindle and the edge of the drive section of the plate, and a third zone (CD).

4. The clamping chuck according to claim 3, wherein the third zone (CD) is rectilinear such that, after the spindle-rotation, the third zone is next to the edge of the drive section of the plate.

5. The clamping chuck according to claim 3, wherein the third zone (CD) is such that, after the spindle rotation, the third zone has a shape that is complementary to the edge of the drive section of the plate.

6. The clamping chuck according to claim 1, comprising means of controlling the oscillation range of a jaw attached to this spindle.

7. The clamping chuck according to claim 6, wherein the means of control of the oscillation range comprises a longitudinal recess built into the spindle into which a nipple connected to the body of said chuck fits and which has a diameter that is less than the width of the longitudinal recess.

8. The clamping chuck according to claim 1, comprising means of triggering the rotation of the spindle around the axis of the spindle for balance.

9. The clamping chuck according to claim 8, wherein the means of triggering the rotation of the spindle comprise a retaining element arranged in a housing in the chuck body comprising a base at the bottom of the housing that is elastically pressed, the base extending by a head that fits into the recess.

10. The clamping chuck according to claim 1, wherein the piston is equipped with indexing means that position the piston relative to the spindle housing such that the drive section is placed facing the latter.

11. A clamping chuck comprising a body accommodating at least one slideably mounted spindle in a housing in the body, said spindle comprising a first end and a second end, said housing being inclined relative to the axis of the chuck and exiting through the front face of the latter, the spindle movement being driven by the movement of a piston along the chuck axis and said spindle being equipped at one end with a groove into which slides a drive section of the piston, the latter and said groove being perpendicular to the axis of said spindle, wherein:

the second end of the spindle comprises a notch exiting into the groove such that, when positioning the spindle from the front face of the chuck, the notch allows the spindle to move along the drive section and touch the latter and enable the groove to be positioned facing said drive section, such that after rotation of the spindle around the axis of the spindle, the groove engages with the drive section;

wherein the clamping chuck further comprises means of triggering the rotation of the spindle around the axis of the spindle for balance; and wherein the means of triggering the rotation of the spindle comprise a retaining element arranged in a housing in the chuck body comprising a base at the bottom of this housing that is elastically pressed, this base extending by a head that fits into the recess.

* * * * *